(12) United States Patent
Joshi et al.

(10) Patent No.: US 8,548,788 B2
(45) Date of Patent: Oct. 1, 2013

(54) TECHNOLOGY COMPUTER-AIDED DESIGN (TCAD)-BASED VIRTUAL FABRICATION

(75) Inventors: Rajiv V. Joshi, Yorktown Heights, NY (US); Rouwaida N. Kanj, Round Rock, TX (US); Keunwoo Kim, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/609,542

(22) Filed: Sep. 11, 2012

(65) Prior Publication Data

US 2013/0060551 A1 Mar. 7, 2013

Related U.S. Application Data

(63) Continuation of application No. 12/820,741, filed on Jun. 22, 2010.

(51) Int. Cl.
*G06F 17/50* (2006.01)

(52) U.S. Cl.
USPC .......................................................... 703/13

(58) Field of Classification Search
USPC .................. 703/13, 14; 716/4, 5, 2, 54, 112; 438/14, 800; 257/204; 382/149
See application file for complete search history.

(56) References Cited

U.S. PATENT DOCUMENTS

| | | | |
|---|---|---|---|
| 6,173,240 B1 | 1/2001 | Sepulveda | |
| 6,826,517 B2 | 11/2004 | Okada | |
| 7,239,997 B2 | 7/2007 | Yonezawa | |
| 7,272,460 B2 | 9/2007 | Akiyama et al. | |
| 7,380,225 B2 | 5/2008 | Joshi et al. | |
| 7,941,768 B1* | 5/2011 | Wei | 716/54 |
| 2005/0233601 A1* | 10/2005 | Tsuchiya et al. | 438/800 |
| 2007/0099314 A1* | 5/2007 | Chen et al. | 438/14 |
| 2007/0124707 A1* | 5/2007 | Sutjahjo et al. | 716/4 |
| 2007/0198956 A1* | 8/2007 | Liu et al. | 716/2 |
| 2008/0059143 A1* | 3/2008 | Chiu et al. | 703/14 |
| 2008/0243461 A1* | 10/2008 | Li et al. | 703/13 |
| 2009/0005894 A1 | 1/2009 | Bomholt et al. | |
| 2009/0019408 A1* | 1/2009 | Saito et al. | 716/5 |

(Continued)

OTHER PUBLICATIONS

Mukhopadhyay et al., Device Design and Optimization Methodology for Leakage and Variability Reduction in Sub-45-nm FD/SOI SRAM, IEEE Transactions on Electron Devices, vol. 55, No. 1, Jan. 2008, pp. 152-162.

(Continued)

*Primary Examiner* — Kandasamy Thangavelu
(74) *Attorney, Agent, or Firm* — Preston J. Young; Ryan, Mason & Lewis, LLP

(57) ABSTRACT

A single finite element mesh is generated for predicting performance of an integrated circuit design. A plurality of sample points are identified for conducting a variability study on at least one parameter associated with the integrated circuit design. The sample points are selected to predict performance of the integrated circuit design when subject to variations in the at least one parameter due to variations in manufacturing processes to be used to manufacture the integrated circuit design. A parameterized netlist is generated corresponding to each of the sample points. A technology computer aided design (TCAD) simulation is run for each of the parameterized netlists, using the single finite element mesh for each of the parameterized netlists, until convergence is achieved, to obtain, for each of the parameterized netlists, at least one metric indicative of the performance of the integrated circuit design. A predicted design yield is developed for the integrated circuit design.

8 Claims, 8 Drawing Sheets

(56) References Cited

U.S. PATENT DOCUMENTS

| | | | |
|---|---|---|---|
| 2009/0024378 A1* | 1/2009 | Dierickx et al. | 703/14 |
| 2009/0031268 A1 | 1/2009 | Miranda et al. | |
| 2009/0326873 A1* | 12/2009 | Wang et al. | 703/1 |
| 2010/0038683 A1* | 2/2010 | Shanware et al. | 257/204 |
| 2010/0119144 A1* | 5/2010 | Kulkarni et al. | 382/149 |
| 2011/0276935 A1* | 11/2011 | Fouquet et al. | 716/112 |

OTHER PUBLICATIONS

Mukhopadhyay et al., Optimal UTB FD/SOI Device Structure Using Thin BOX for Sub-50-nm SRAM Design, IEEE Electron Device Letters, vol. 27, No. 4, Apr. 2006, pp. 284-287.

Taurus Medici, http://www.synopsys.com/tools/tcad/devicesimulation/pages/taurusmedici.aspx, Nov. 2, 2010.

Technology CAD, Wikipedia, http://en.wikipedia.org/wiki/Technology_CAD, Nov. 2, 2010.

Kanj et al., Mixture Importance Sampling and Its Application to the Analysis of SRAM Designs in the Presence of Rare Failure Events, DAC 2006, Jul. 24-28, 2006, pp. 69-72.

Rankin et al., Statistical SPICE Extraction Using an Integrated TCAD Framework, 2000 International Conference on Simulation of Semiconductor Processes and Devices: SISPAD 2000.

Sentaurus TFM, TCAD for Manufacturing Solution, 2005, pp. 1-4.

Monte Carlo method, Wikipedia, http://en.wikipedia.org/wiki/Monte_Carlo_method, Apr. 7, 2010.

Fallon et al., Integration of Costing, Yield and Performance Metrics Into the TCAD Environment through the Combination of DOE and RSM, 1995 International Symposium on Semiconductor Manufacturing, 1995 International Symposium on Semiconductor Manufacturing, pp. 266-270.

Shedabale et al., Statistical Modelling of the Variation in Advanced Process Technologies Using a Multi-Level Partitioned Response Surface Approach, IET Circuits Devices Syst., 2008, vol. 2, No. 5, pp. 451-464 doi:10.1049/iet-cds:20080031.

Hanson et al., Analysis of Mixed-Signal Manufacturability with Statistical Technology CAD (TCAD), IEEE Transactions on Semiconductor Manufacturing, vol. 9, No. 4., Nov. 1996.

Rodriguez et al., ESD Circuit Synthesis and Analysis Using TCAD and SPICE, 1998 IEEE, pp. 97-100.

Chen et al., Improving Manufacturing Variability Control in Advanced CMOS Technology by Using TCAD Methodology, Data Analysis and Modeling for Process Control, edited by Kenneth W. Tobin, Jr., Proc. of SPIE, vol. 5378 (SPIE, Bellingham, WA, 2004). pp. 215-220.

Mutlu et al., Statistical Methods for the Estimation of Process Variation Effects on Circuit Operation, IEEE Transactions on Electronics Packaging Manufacturing, vol. 28, No. 4, Oct. 2005, pp. 364-375.

V. Senez et al., "Two-Dimensional Simulation of Local Oxidation of Silicon: Calibrated Viscoelastic Flow Analysis," IEEE Transactions on Electron Devices, May 1996, pp. 720-731, vol. 43, No. 5.

L. Borucki et al., "FEDSS—A 2D Semiconductor Fabrication Process Simulator," IBM Journal of Research and Development, May 1985, pp. 263-276, vol. 29, No. 3.

P.M. Fahey et al., "Stress-Induced Dislocations in Silicon Integrated Circuits," IBM Journal of Research and Development, Mar. 1992, pp. 158-182, vol. 36, No. 2.

S.E. Hansen et al., "SUPREM-IV.GS—Two Dimensional Process Simulation for Silicon and Gallium Arsenide," Stanford University, Integrated Circuits Laboratory, 1993, 320 pages.

* cited by examiner

TECHNOLOGY COMPUTER-AIDED DESIGN (TCAD)-BASED VIRTUAL FABRICATION

CROSS-REFERENCE TO RELATED APPLICATIONS

This application is a continuation of U.S. patent application Ser. No. 12/820,741, filed Jun. 22, 2010, incorporated by reference herein.

FIELD OF THE INVENTION

The present invention relates to the electrical, electronic and computer arts, and, more particularly, to computer-aided design of electronic circuitry and the like.

BACKGROUND OF THE INVENTION

Chip design with iterative fabrication cycles is expensive and quite slow. Fabrication steps involve processes such as lithography, doping, etching, chemical mechanical polishing, and the like. Manufacturing processes, however, are not deterministic, and have inherent random and systematic variability built into them. Design-for-Manufacturing (DfM) methods can predict and/or project fabrication results using fully-software-based tools. Technology Computer-Aided Design (TCAD) tools can be one of the key components of DfM. However, numerical device simulations (i.e., TCAD) are based on solving drift-diffusion or hydrodynamic transport equations which are forms of partial differential equations. One example of such simulations is the MEDICI: 2-D Device Simulation tool available from Synopsys Inc., Mountain View, Calif., USA.

Furthermore, device and/or circuit mix-mode simulations consume additional effort and more time, so TCAD tools cannot be directly used in circuit analysis. TCAD-embedded statistical analysis cannot be applied in the DfM world due to computational time and a weak TfM (TCAD for manufacturability) infrastructure. TCAD simulations and methods have expensive computational times and cannot be directly inserted into DfM flows.

Prior art techniques have focused on "SPICE compact models" for the device or the device variability to study design yield.

SUMMARY OF THE INVENTION

Principles of the invention provide technology computer-aided design (TCAD)-based virtual fabrication. In one aspect, an exemplary method includes the steps of generating a single finite element mesh for predicting performance of an integrated circuit design; and identifying a plurality of sample points for conducting a variability study on at least one parameter associated with the integrated circuit design. The sample points are selected to predict performance of the integrated circuit design when subject to variations in the at least one parameter due to variations in manufacturing processes to be used to manufacture the integrated circuit design. Additional steps include generating a parameterized netlist corresponding to each of the sample points; and running a technology computer aided design simulation for each of the parameterized netlists, using the single finite element mesh for each of the parameterized netlists, until convergence is achieved, to obtain, for each of the parameterized netlists, at least one metric indicative of the performance of the integrated circuit design. A further step includes developing a predicted design yield for the integrated circuit design, based on the at least one metric determined for each of the parameterized netlists.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more technical benefits, such as a fast and efficient TCAD methodology with an interface to a fast statistical method, with no need to rely on empirical inputs.

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

Figure 1:
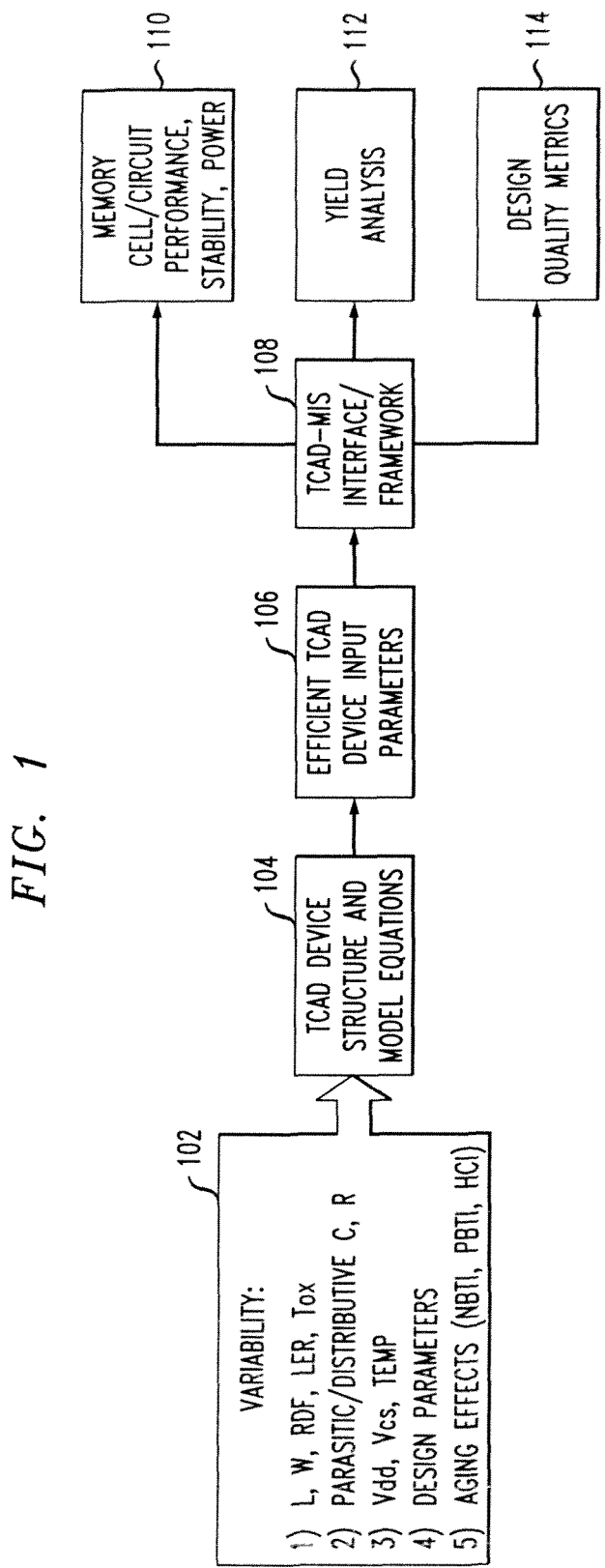
FIG. 1 is a diagram illustrating exemplary techniques for TCAD for manufacturing of a process-sensitive circuit, according to an aspect of the invention.

As noted, chip design with iterative fabrication cycles is expensive and quite slow. Fabrication steps involve processes such as lithography, doping, etching, chemical mechanical polishing, and the like. Manufacturing processes, however, are not deterministic, and have inherent random and systematic variability built into them. Design-for-Manufacturing (DfM) methods can predict and/or project fabrication results using fully-software-based tools. Technology Computer-Aided Design (TCAD) tools can be one of the key components of DfM. However, numerical device simulations (i.e., TCAD) are based on solving drift-diffusion or hydrodynamic transport equations which are forms of partial differential equations. One example of such simulations is the MEDICI: 2-D Device Simulation tool available from Synopsys Inc., Mountain View, Calif., USA.

Furthermore, device and/or circuit mix-mode simulations consume additional effort and more time, so TCAD tools cannot be directly used in circuit analysis. TCAD-embedded statistical analysis cannot be applied in the DfM world due to computational time and a weak TfM (TCAD for manufacturability) infrastructure. TCAD simulations and methods have expensive computational times and cannot be directly inserted into DfM flows.

One or more embodiments advantageously provide fast and accurate circuit simulations and analyses which permit capturing rapidly-changed device features and intrinsic device fluctuation, as well as random mismatch among adjacent devices. One or more embodiments provide techniques for improving circuit design and production for manufacturing yield. In one aspect of the invention, a method for TfM of a process-sensitive circuit is provided. Based on physical and process variability sources, a virtual representation of a fabricated system is obtained using physical TCAD parameters that can account for process variations during a circuit production process. The physical TCAD parameters are modified to help improve the circuit and/or the production process. These steps are repeated until a desired projected production yield is attained.

One or more embodiments of the invention provide a robust and fast TfM framework by interfacing TCAD and fast importance sampling (fast statistical) techniques and to convert device variability sources to TCAD parameters for efficient and fast statistical analysis, which is an innovative TCAD simulation method. A non-limiting example of fast importance sampling (fast statistical) techniques is set forth in:

R. Kanj, R. Joshi, & S. Nassif, "Mixture importance sampling and its application to the analysis of SRAM designs in the presence of rare failure events," Design automation conference, 2006.

U.S. Pat. No. 7,380,225 of Joshi et al. entitled "Method and computer program for efficient cell failure rate estimation in cell arrays."

The skilled artisan will be familiar with such techniques; nevertheless, the complete Kanj et al. paper and the complete disclosure of U.S. Pat. No. 7,380,225 are expressly incorporated herein by reference in their entirety for all purposes. The skilled artisan will of course realize that an SRAM is a static random access memory.

Advantageously, one or more embodiments, as compared to past techniques, are much more accurate and efficient to characterize and predict circuits and yields, and they are applicable to variety of variations such as, by way of example and not limitation, random-dopant variation, line-edge roughness, oxide fluctuations, time-dependent reliability, supply voltage ($V_{dd}$), cell-supply voltage ($V_{cs}$), L, W, and temperature (L and W, gate length and channel width respectively, are non-limiting examples of device dimensions).

FIG. 1 is a diagram illustrating a methodology for TfM of a process-sensitive circuit, in accordance with an aspect of the invention. The term "process-sensitive circuit," as used herein, generally includes any circuit whose function and/or quality can be affected by the circuit production process. Exemplary process-sensitive circuits include, but are not limited to, memory cell arrays, such as static random access memory (SRAM) and dynamic random access memory (DRAM) cell arrays. As will be described in detail below, the performance of memory cells, such as SRAM, can be affected by variations that can occur during a circuit production process, such as random dopant fluctuations (RDFs) which can result in threshold voltage ($V_T$) variations and patterning process variations, e.g., lithography variations. As shown at 102, variability sources can include (again by way of example and not limitation) gate length (L), channel width (W), RDF, LER (line edge roughness), oxide thickness ($T_{ox}$) parasitic and/or distributive capacitance and/or resistance, supply voltage ($V_{dd}$), cell-supply voltage ($V_{cs}$), chip temperature, design parameters, and aging effects (negative bias temperature instability (NBTI), positive bias temperature instability (PBTI), and hot carriers injection (HCI)).

As shown at 104, a TCAD device structure can be generated in lieu of many mesh structures depending on the variability sources. Then, TCAD input parameters 106 can be physically evaluated based on model equations and device structures. As shown at 108, the parameters can be directly used in importance sampling, such as MIS (mixture importance sampling) statistical calculations, which can be applied, for example, to analysis of memory cell and/or circuit performance, power, and/or stability, as at 110; yield, as at 112; and design quality metric(s), as at 114. Given the teachings herein, the skilled artisan will be able to adapt techniques from the aforementioned U.S. Pat. No. 7,380,225 and/or the aforementioned Kanj et al. paper to implement importance sampling in one or more embodiments of the invention.

One or more embodiments of the combined interface 108 may provide one or more of the following advantages:

The fast statistical analysis enables estimating low fail probability with a reasonably low number of samples involved. This makes it more practical to perform statistical analysis at the mixed-mode level, and therefore allows for the usage of TCAD-based statistical design and yield analysis.

The TCAD mixed mode analysis enables more physical (i.e., based on underlying physics by solving (typically in discretized form) underlying partial differential equations, as opposed to using empirical correlations) and accurate analysis of the effects of statistical process parameter variation on the yield. Such effects may not be well abstracted or captured with traditional process models or SPICE-like circuit simulation-based approaches. This aspect includes but is not limited to the:
  ability to properly model nonrectangular device shapes; existing efforts to model based on table-based abstractions are designed to match only certain regions of the device characteristics.
  complex interaction of different process parameters whose effects may not be well modeled in existing device models like stress, mobility mismatch and other device characteristics.

Furthermore, with the increase in variability, the process parameter variations often stretch beyond the modeling limits, thereby in a traditional approach, designers often rely on extrapolations of the models to account for such large variations; a TfM approach in accordance with one or more embodiments of the invention captures the true and physical (again, based on underlying physics by solving (typically in discretized form, such as via the finite element method) underlying partial differential equations, as opposed to using empirical correlations) device characteristics.

This approach can enable on the fly process and/or memory design yield optimizations even if real hardware is not available. For example, it is possible to study the stability of the SRAM cell if it is decided to change some halo implants, special types of doping, and so on.

Finally, depending on the available abstractions and the desired process variations to be studied, the approach can be used in a hybrid fashion, where mixed-mode analysis can call some simplified models, or call TCAD based on the criticality of and/or availability of models for the type of process variation being modeled. This approach is device characteristics based.

Alternatively, it is possible to construct a fail-region based analysis, where critical samples that fall on the boundary are analyzed by mixed-mode techniques, whereas samples that strongly pass or strongly fail can be analyzed with SPICE-like methods. By way of further explanation, during statistical modeling, consider a rare failure mode region (larger $\sigma$). In one or more instances, initially, sample uniformly from, e.g., $-6\sigma$ to $+6\sigma$. Assign uniform probability to each transistor and determine probability of failure. Within a cluster, locate the center of gravity and shift the Gaussian distribution and sample in the region of a strong fail. See FIG. 7 and accompanying discussion below.

In an alternative embodiment, compare track over the region of variability TCAD/SPICE-like regions of agreement and use that to guide TCAD simulation requests. That is to say, because SPICE is relatively fast and TCAD is relatively slow, seek to determine important regions where TCAD is to be used and use SPICE elsewhere.

Figure 2:
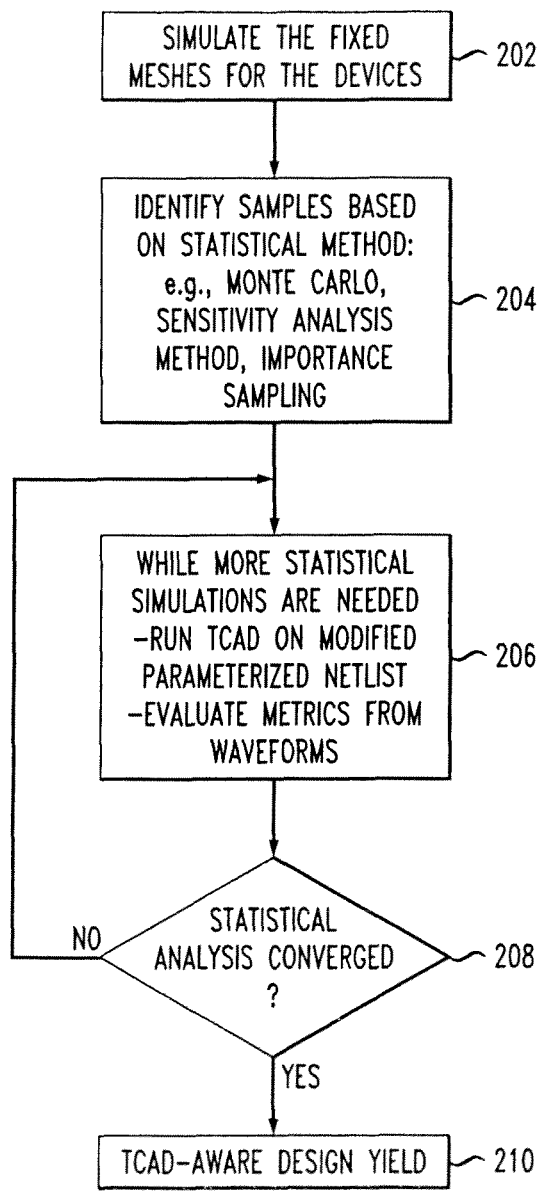
FIG. 2 shows an exemplary interface between TCAD and a statistical sampling technique, according to another aspect of the invention.

FIG. 2 shows the proposed TCAD-statistical sampling interface. As shown at 202, build a fixed mesh for device simulation. In one or more embodiments, rather than changing the mesh each time for changes in a parameter (e.g., dopant placement or any of a number of other parameters such as those discussed above), use a single mesh for all runs and change parameter values such as dopant density, mobility, or the like. In step 204, identify a set of statistical samples using a suitable statistical method, such as Monte Carlo, sensitivity analysis, importance sampling, or the like. By way of example and not limitation, initially sample the parameter space uniformly. Run TCAD for each one of the samples, as at step 206, on a netlist modified for the specific parameter values. Such a parameterized TCAD netlist will include circuit elements, their corresponding nodes, and one or more parameters, e.g., dopant density, work function, and the like, and their corresponding values. One non-limiting example of a TCAD input file includes p_in vals (parameter values) in the TAURUS MEDICI software available from Synopsys, Inc., Mountain View, Calif., USA (SENTAURUS software from Synopsys is another non-limiting example of suitable software). Again, instead of changing the mesh, in one or more embodiments, change the parameters. Each simulation (i.e., for each statistical sample) is based on its own parameterized netlist, and each of the parameterized netlists changes the values of suitable parameter(s) such as dopant density, work function, or the like, rather than changing the mesh. In each simulation for each different parameterized netlist corresponding to each different statistical sample, run TCAD on the given parameterized netlist, as at step 206. The result is then the transient (or AC) waveforms of the studied samples; note that the type of study (DC and/or AC) is based on the designer's intent. One or more metrics of interest are evaluated from the waveform(s) for each sample. An example of a metric is the maximum noise on a given node. A determination is made in step 208 as to whether convergence has occurred (i.e., within a particular parameterized netlist, run until convergence; once converged, check and see if there are still more samples to be run). For example, if using a standard Monte Carlo technique, continue to simulate until the estimate reaches convergence. In the case of importance sampling, as in FIG. 7, to be discussed further below, first undertake uniform sampling on one or several thousand simulations, then obtain a center of gravity of fails and undertake shifted Monte Carlo sampling to carry out importance sampling in a second jump and check for convergence.

As shown at 210, the result is a TCAD-aware design yield.

For memory designs, yield analysis has often focused on dynamic (transient) behavior of the design. The results for statistical simulations are then used to identify fails based on predefined user criteria which then are used to compute probabilities. The importance sampling phase includes multiple statistical analysis stages; typically, one that searches for critical fails and others that focus on the fail regions. Thus for each stage, the process is continued until enough samples are studied to satisfy certainty.

Figure 7:
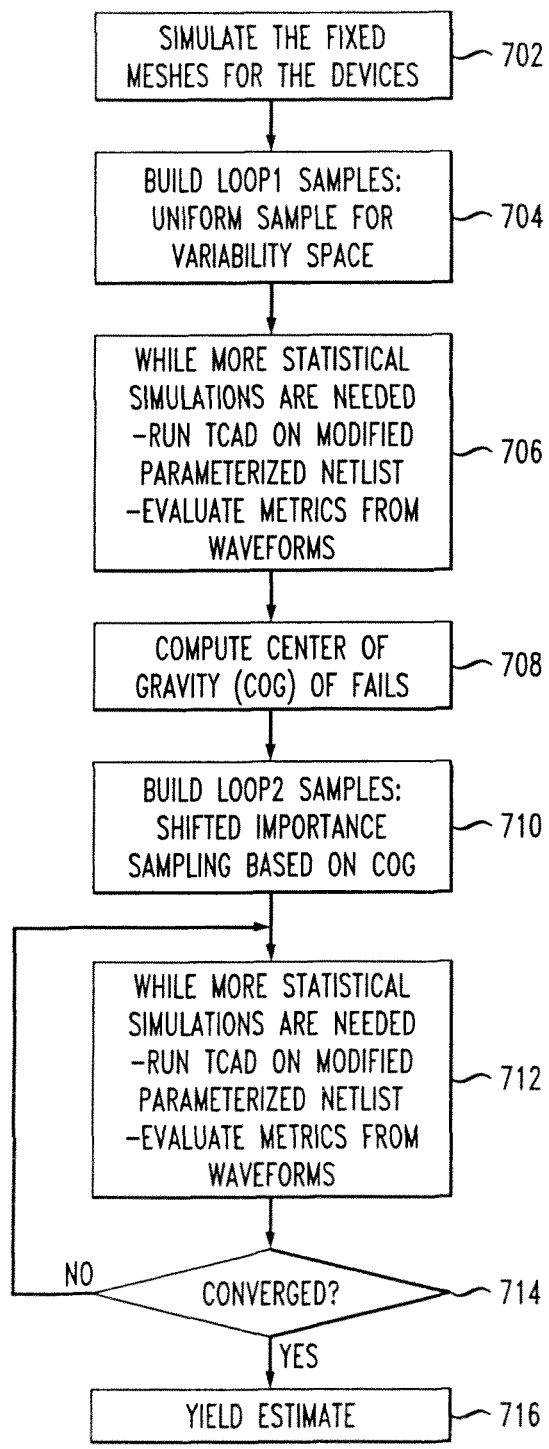
FIG. 7 shows another exemplary interface between TCAD and a statistical sampling technique (importance sampling), according to still another aspect of the invention.

FIG. 7 shows a flow chart analogous to that of FIG. 2 but for importance-based sampling. Step 702 is identical to step 202. In step 704, develop the samples for a first loop (typically uniform sampling). Step 706 is analogous to step 206. In step 708, compute the center of gravity for the fails predicted from step 706. In step 710, build new samples for a second loop, using shifted importance sampling based on the identified centers of gravity for fails. Step 712 is analogous to step 706 but for the revised samples. It is repeated until convergence is achieved, as per step 714. The result is yield estimate 716.

Figure 3:
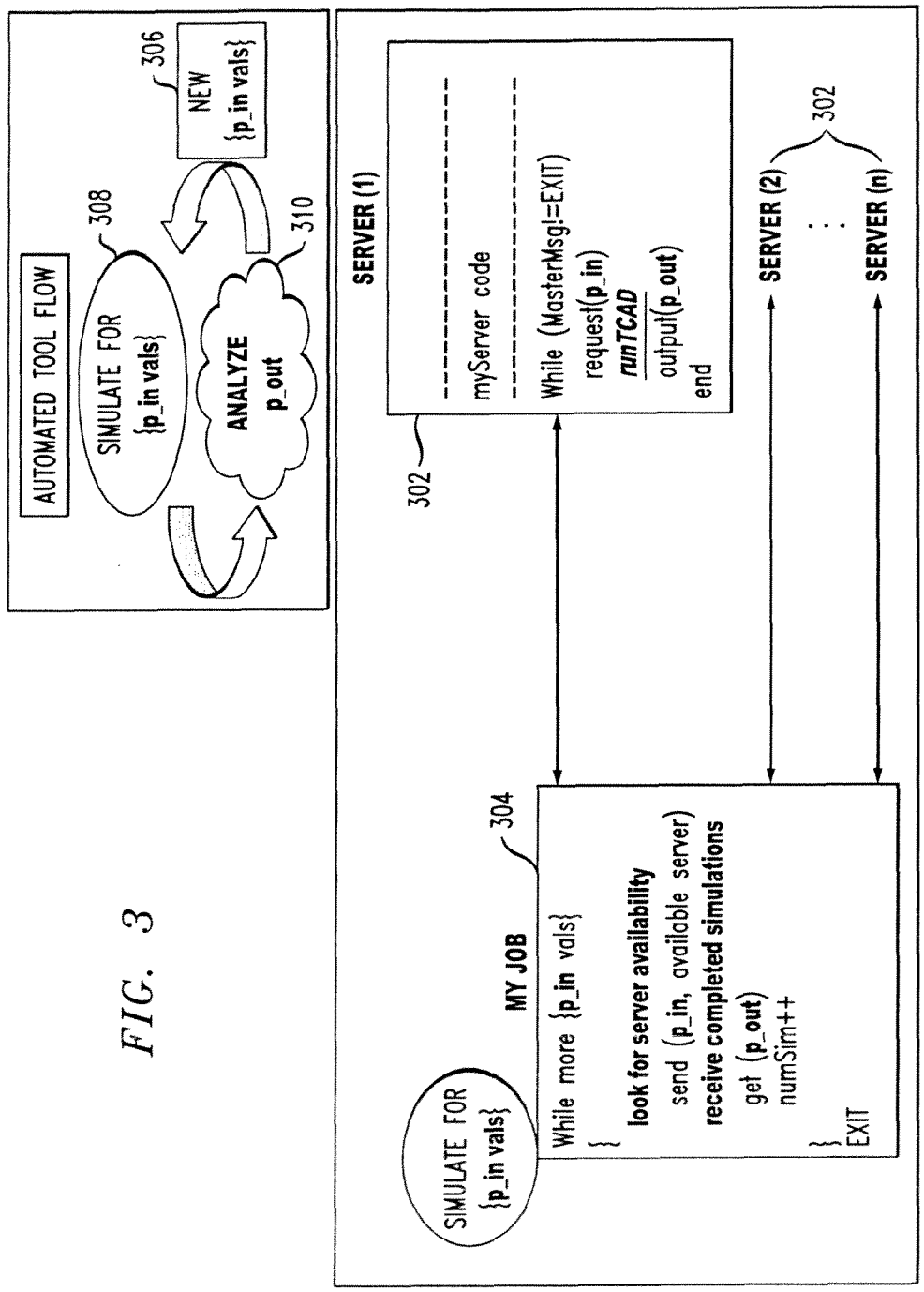
FIG. 3 shows an exemplary dynamic client-server implementation of TCAD and a fast sampling technique, according to still another aspect of the invention.

As shown with respect to FIG. 3, methods can be performed in parallel per loop with client-server protocol embedded with dynamic load assignment based on server availability. That is to say, for multiple samples, the job can be parallelized. FIG. 3 depicts a dynamic parallelization (dynamic load assignment strategy). Suppose, for example, there are ten machines 302, numbered 1 to n. Each machine can have code that will wait for the next sample. The master machine 304 running the main job will look over the pool of samples and determine which machine 302 is available for the next simulation; that machine will be provided with a new "p_in vals" to simulate and a corresponding new p_out will be obtained. Because the runs for different values of the parameters (different samples) do not depend on each other, the problem is readily parallelized. That is to say, if runs were to be conducted for dopant densities of, say, $Density_1$, $Density_2$, and $Density_3$, the run for $Density_2$ does not depend on that for $Density_1$ or $Density_3$. The overall process is depicted at the upper right-hand corner of FIG. 3, wherein new p_in vals are provided at 306, simulation is conducted for those values at 308, and the corresponding outputs p_out are analyzed at 310.

One or more embodiments of the invention thus provide a TCAD-importance sampling interface tool to optimize circuits (such as SRAM circuits) and manufacturing yield. Further, one or more embodiments provide TCAD innovation by varying physical parameters without regenerating mesh process for variability study. In at least some instances, fast numerical Monte Carlo simulations can be embedded in TCAD-based DfM methods. Furthermore, one or more embodiments provide technology and/or process-compatible TCAD simulation and analysis, and/or analysis methods of process parameters for DfM impact.

One or more instances of the invention provide a robust and fast TfM framework by interfacing TCAD and fast importance sampling (fast sta(istical) techniques (e.g., MIS); and/or convert device variability sources to TCAD parameters for efficient and fast statistical analysis in an innovative TCAD simulation method.

One or more embodiments do not rely on empirical inputs, and thus are able to avoid the very long step and inaccurate results encountered with TCAD-to-SPICE techniques (due to the empirical SPICE parameters employed in such techniques). One or more embodiments advantageously provide the ability to perform immediate device and/or circuit simulations to predict yield, unlike techniques having long and complex simulation cycles.

It should be noted that, unlike one or more current techniques which use empirical approximations for the L and W parameters, one or more embodiments use the true L and W values. Advantageously, one or more embodiments thus avoid the issues associated with L and W approximations, which are typically inadequate for use with memories and analog or RF (radio frequency) circuitry. SRAM-like circuits operate in an analog fashion, in that the devices may be in the linear or saturation regions, such that matching only the off and on currents is insufficiently accurate. Further, one or more embodiments do not need to employ error prone compact models. In one or more embodiments, the lithographic contours can be fed to the TCAD tool, and mix-mode simulation can address the layout-dependent variability. Furthermore, one or more embodiments advantageously provide flexibility in the presence of novel device recipes.

It is believed that one or more embodiments can benefit from computational parallelization, as per FIG. 3.

Thus, one or more embodiments provide speed-up of TCAD for in situ fast statistical TCAD analysis of the circuit understudy and/or fast statistical TCAD analysis for the yield of circuit designs. One or more embodiments include a fast statistical method with physical TCAD parameters-based methods. One or more embodiments do not require device model abstractions. One or more embodiments do not require other three-dimensional (3-D) simulators for statistical variability analysis.

Note that the "speed-up of TCAD" embedding statistical technique is quite significant in one or more embodiments.

Again, one or more embodiments provide fast and accurate methods of TCAD with interfaced statistical methods.

Examples

Figure 4:
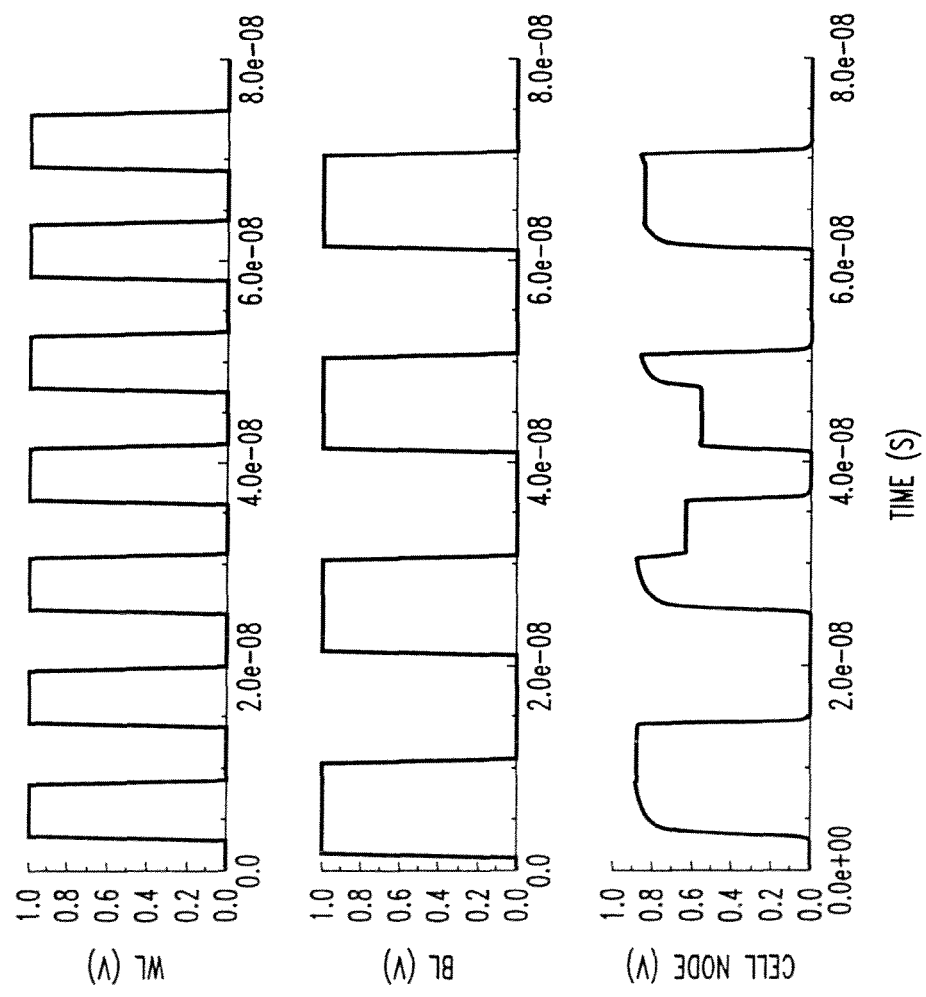
FIGS. 4 and 5 present exemplary TCAD simulations.

A non-limiting exemplary simulation was carried out using an embodiment of the TCAD-to-importance sampling interface. Due to the reduced TCAD simulation cycle and fast importance sampling, the exemplary simulation reduced the number of simulations from millions to a few thousand. FIG. 4 shows TCAD device and/or circuit mix mode simulations for a simplified embedded dynamic random access memory (eDRAM) structure 402. Structure 402 includes word line 404, bit line 406, access transistor 408, cell node 410, and trench capacitor 412 between node 410 and ground. The simulation was conducted for a Partially Depleted Silicon-On-Insulator (PDSOI) DRAM with a trench capacitance of 20 femtofarads (fF) and a bit line capacitance of 200 fF. The word line, bit line, and simulated cell node voltages are shown as a function of time in seconds. The above-described TCAD-importance sampling interface is capable of analyzing variations in many different parameters; purely for the sake of illustration and not limitation, trench capacitance was analyzed as a parameter of interest in this example.

Figure 5:
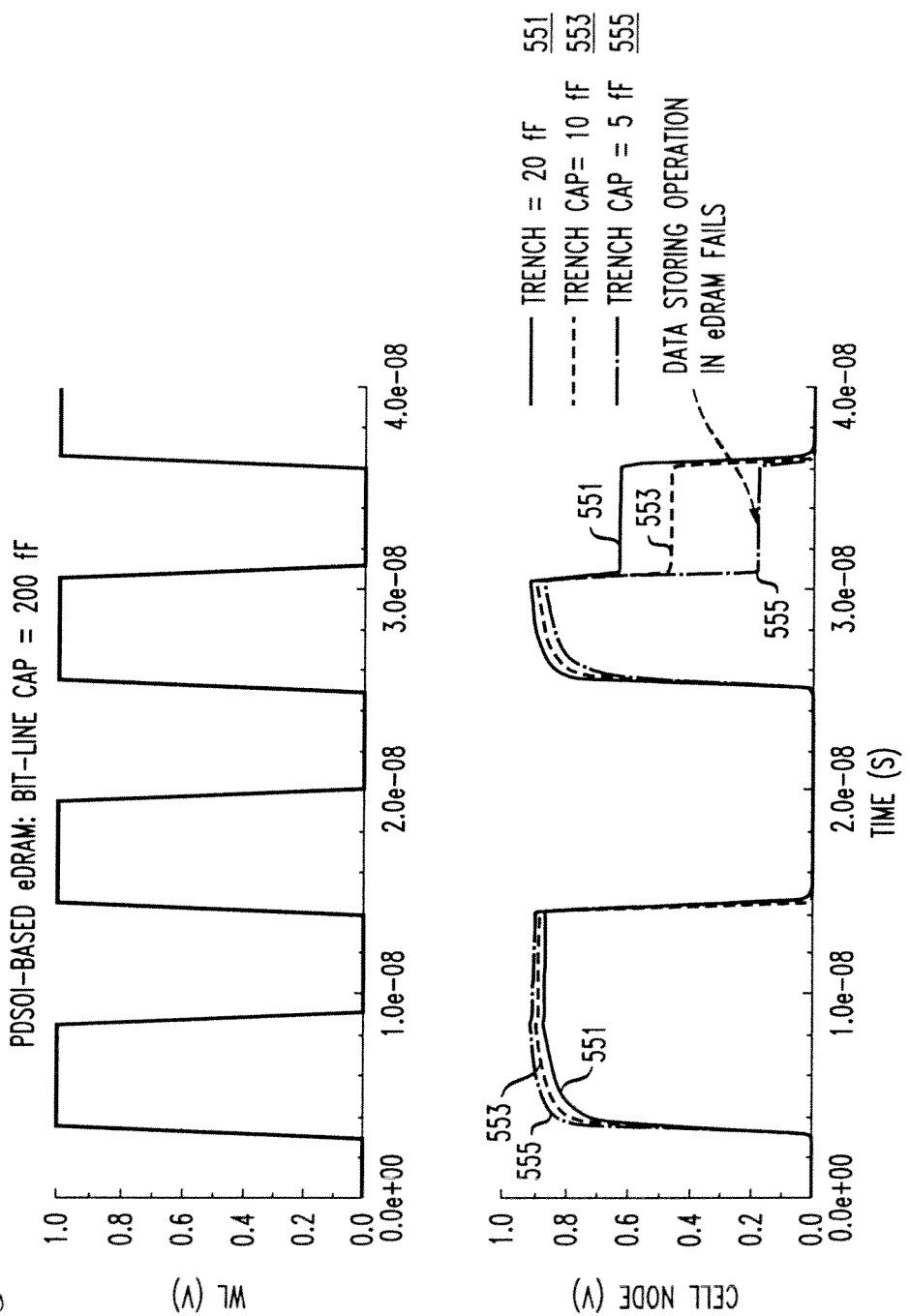

A non-limiting exemplary yield test simulation was also carried out using an embodiment of the TCAD-to-importance sampling interface. The eDRAM cell 402 was used as an example. As shown in FIG. 5, for the lower storage (trench) capacitance (around 5 fF), the data storing operation in the eDRAM can fail. Curve 551 is for 20 fF, curve 553 is for 10 fF, and curve 555 is for 5 fF. Curve 555 is too close to logical zero (whereas, ideally, it should be at or close to a logical one) and thus a failure can ensue. In this example, the above-mentioned metric (e.g., steps 206, 706, 712) is whether the eDRAM is capable of having a logical one written to it or not. The curves for the cell node in FIG. 5 are examples of the above-mentioned waveforms (e.g., steps 206, 706, 712). While not depicted in the figure, exemplary experimental simulations have demonstrated that TCAD-aided methods can also predict the failure of eDRAMs due to lithographical and electrical variations.

In one or more embodiments, the simulation time is on the order of hours, whereas current workflows may involve weeks of simulations. For example, a mixed-mode simulation with simplified TCAD parameter distributions from hardware $V_T$ distribution and dopant density distribution takes about 2-3 minutes per simulation. Importance sampling (Fast Monte Carlo) reduces the number of simulations from millions to a few thousand. The experimental eDRAM example mentioned above ran on two client/server connections in 14 hours, with assumed work function variability and assumed trench capacitance variability. Current techniques with TCAD device simulation plus mixed mode simulation for a very basic circuit, such as a one-stage inverter, with a reasonable amount of mesh, can take on the order of a day; furthermore, current Monte Carlo techniques require millions of samples. It is to be emphasized that the exemplary run times are presented for purely illustrative purposes and different results may be obtained with other embodiments of the invention and/or when simulating different problems.

It is worthwhile observing that in current techniques, exemplary inputs to a SPICE (empirical equations not modeling the underlying physics with the finite element method) analysis could include mobility ($\mu_0$), and empirical (i.e., not actual) values for L and W, as well as compact models. The empirical values for the device dimensions may vary for off and on currents, due to variations inline edge roughness as technology scales. However, in one or more examples employing embodiments of the invention, the actual device characteristics (e.g., mobility ($\mu_0$)) and actual device dimensions are employed, modeling the underlying physics with the finite element method, so the aforementioned errors are not introduced as technology scales.

Recapitulation

Given the discussion thus far, it will be appreciated that, in general terms, an exemplary method, according to an aspect of the invention, includes the step 202, 702 of generating a single finite element mesh for predicting performance of an integrated circuit design. A further step 204, 704 includes identifying a plurality of sample points for conducting a variability study on at least one parameter associated with the integrated circuit design. The sample points are selected to predict performance of the integrated circuit design when subject to variations in the at least one parameter due to variations in manufacturing processes to be used to manufacture the integrated circuit design. A further step 206, 706 includes generating a parameterized netlist corresponding to each of the sample points and running a technology computer aided design simulation for each of the parameterized netlists, using the single finite element mesh for each of the parameterized netlists, until convergence is achieved, to obtain, for each of the parameterized netlists, at least one metric indicative of the performance of the integrated circuit design. A further step 210, 716 includes developing a predicted design yield for the integrated circuit design, based on the at least one metric determined for each of the parameterized netlists.

In at least some instances, the identification of the plurality of sampling points includes selecting such sampling points via random and/or quasi-random statistical sampling. Such sampling can include, for example, standard sampling such as Monte Carlo sampling, and/or fast sampling such as variance reduction. The skilled artisan will be familiar with random statistical sampling, quasi-random statistical sampling, standard sampling such as Monte Carlo sampling, and fast sampling such as variance reduction, and, given the teachings herein, will be able to implement one or more embodiments of the invention using one or more of the mentioned sampling techniques.

Figure 8:
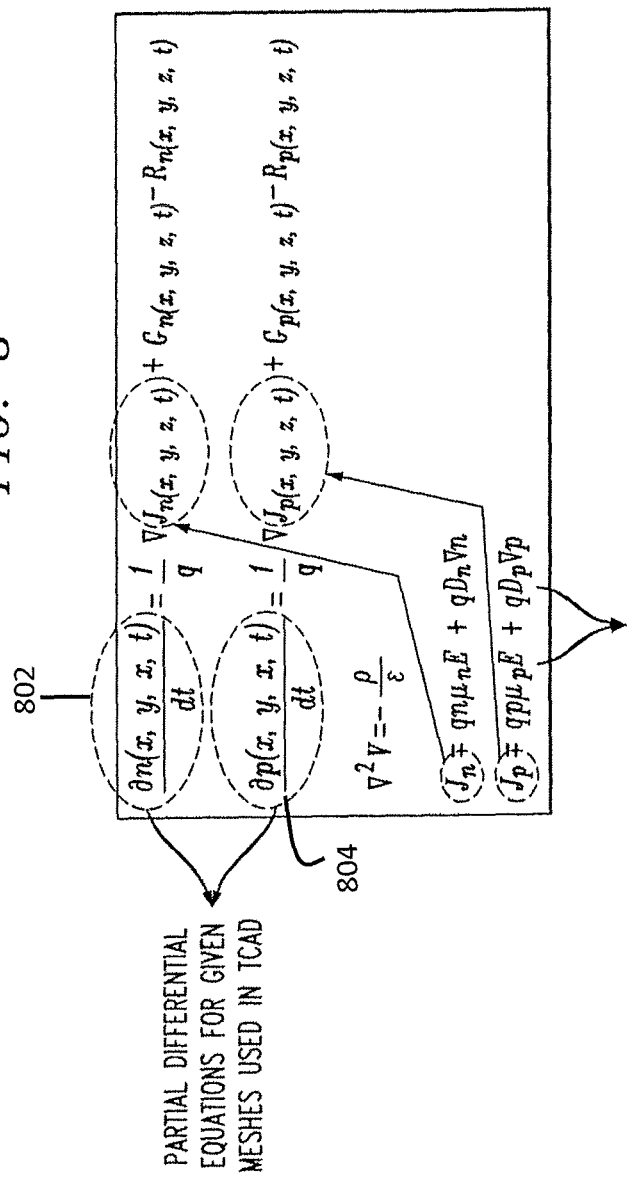
FIG. 8 illustrates an aspect of the invention wherein meshes require solving partial differential equations for the finite element method but the TCAD physical model does not need additional repeated mesh generation processes.

With reference to FIG. 8, by way of review with regard to the aspect wherein only the single mesh is used, meshes require solving partial differential equations for the finite element method. However, in one or more embodiments, the TCAD physical model does not need additional repeated mesh generation processes. FIG. 8 shows at 802, 804 some of the partial differential equations for given meshes used in TCAD. Note that $\mu_n$, $\mu_p$, $D_n$, and $D_p$ are exemplary physical parameters used in TCAD, and represent, respectively, electron mobility, hole mobility, electron diffusivity, and hole diffusivity.

In the case of importance sampling, the identifying step 704 is a first identifying step in which the sample points comprise first sample points and are uniformly distributed; and the generating step and running step in step 706 are first running and first generating steps. Additional steps include step 708, computing a center of gravity of fails noted in the first running step; step 710, namely, based on the center of gravity of fails, identifying a second set of sample points via importance sampling; and step 712. Step 712 includes generating a second set of parameterized netlists corresponding to each of the second sample points; and running a technology computer aided design simulation for each of the second parameterized netlists, using the single finite element mesh for each of the second parameterized netlists, until convergence is achieved (in step 714), to obtain, for each of the second parameterized netlists, at least one metric indicative of the performance of the integrated circuit design. The predicted design yield in step 716 is further based on the at least one metric determined for each of the second parameterized netlists (i.e., in the case of a single loop in FIG. 2, the predicted design yield is directly based on the metrics from step 206 whereas in the importance based sampling approach of FIG. 7, the predicted design yield is directly based on the metrics from step 712 and indirectly based on the metrics from step 706, which were used as an intermediate result to obtain the final yield estimate 716.

In one or more embodiments of the method, the first and second sets of netlists are actual values of device dimensions. The at least one parameter can be, by way of example and not limitation, one or more of: gate length, channel width, random dopant fluctuation, line edge roughness, oxide thickness, parasitic capacitance, parasitic resistance, distributive capacitance, distributive resistance, supply voltage, cell-supply voltage, chip temperature, negative bias temperature instability, positive bias temperature instability, and hot carriers injection.

In any of steps 206, 706, 712, an additional step can include executing individual simulations corresponding to given ones of the first and second parameterized netlists on at least two separate processors under control of at least a third processor; for example, as per FIG. 3.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
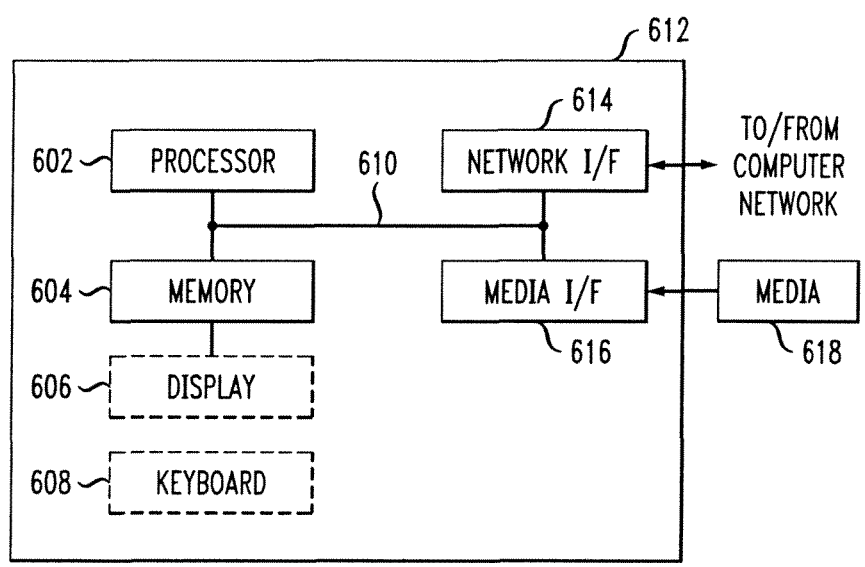
FIG. 6 depicts a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams of FIGS. 1 and 3 or modules configured to carry out any one, some, or all of the steps illustrated in the flow charts of FIGS. 2 and 7; by way of example and not limitation, a TCAD module, a TCAD-MIS (or other statistical) interface module, and an MIS (or other statistical) module. Furthermore, where parallelization is employed, the TCAD module can include a control module running as in block 304 and individual server modules running as in block 302. The method steps can then be carried out using the distinct software module(s) and/or sub-modules of the system, as described above, executing on one or more hardware processors 602. For example, steps 202 and 702 can be carried out by the TCAD module executing on at least one hardware processor, steps 204, 704, and 710 can be carried out by the statistical sampling module executing on the at least one hardware processor; netlist generating steps can be carried out by the TCAD-statistical interface module executing on the at least one hardware processor; steps 206, 706, and 712 can be carried out by the TCAD module executing on the at least one hardware processor, and step 708 can be carried out by the statistical sampling module executing on the at least one hardware processor. Furthermore, where parallelization as in FIG. 3 is employed, steps 206, 706, 712 can be carried out by at least two of the individual server modules under control of the control module executing on the at least one hardware processor. Further, a computer program product can include a computer-readable storage medium with code adapted to be implemented to carry out one or more method steps described herein, including the provision of the system with the distinct software modules. Yet further, the data manipulated in the blocks and steps in FIGS. 1-3 and 7 is representative of physical devices, circuits, and packages.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   generating a single finite element mesh for predicting performance of an integrated circuit design;
   identifying a plurality of sample points for conducting a variability study on at least one parameter associated with said integrated circuit design, said sample points being selected to predict performance of said integrated circuit design when subject to variations in said at least one parameter due to variations in manufacturing processes to be used to manufacture said integrated circuit design;
   generating a parameterized netlist corresponding to each of said sample points;
   running a technology computer aided design simulation for each of said parameterized netlists, using said single finite element mesh for each of said parameterized netlists, wherein said single finite element mesh remains unchanged for different parameters of each of said parameterized netlists, until convergence is achieved, to obtain, for each of said parameterized netlists, at least one metric indicative of said performance of said integrated circuit design; and
   developing a predicted design yield for said integrated circuit design, based on said at least one metric determined for each of said parameterized netlists.

2. The method of claim 1, wherein said identification of said plurality of sampling points comprises selecting said sampling points via at least one of random and quasi-random statistical sampling.

3. The method of claim 2, wherein:
   said identifying step comprises a first identifying step in which said sample points comprise first sample points and are uniformly distributed;
   said generating step comprises a first generating step; and said running step comprises a first running step;
   further comprising the additional steps of:
   computing a center of gravity of fails noted in aid first running step;
   based on said center of gravity of fails, identifying a second set of sample points via importance sampling;
   generating a second set of parameterized netlists corresponding to each of said second sample points; and
   running a technology computer aided design simulation for each of said second parameterized netlists, using said single finite element mesh for each of said second parameterized netlists, until convergence is achieved, to obtain, for each of said second parameterized netlists, at least one metric indicative of said performance of said integrated circuit design;
   wherein said predicted design yield is further based on said at least one metric determined for each of said second parameterized netlists.

4. The method of claim 3, wherein said first and second sets of netlists comprise actual values of device dimensions.

5. The method of claim 4, wherein said at least one parameter comprises at least one of:
   gate length;
   channel width;
   random dopant fluctuation;
   line edge roughness;
   oxide thickness;
   parasitic capacitance;
   parasitic resistance;
   distributive capacitance;
   distributive resistance;
   supply voltage;

cell-supply voltage;
chip temperature;
negative bias temperature instability;
positive bias temperature instability; and
hot carriers injection.

6. The method of claim 4, further comprising the additional step of, within at least one of said first and second running steps, executing individual simulations corresponding to given ones of said first and second parameterized netlists on at least two separate processors under control of at least a third processor.

7. The method of claim 6, further comprising providing a system, wherein the system comprises distinct software modules, each of the distinct software modules being embodied on a computer-readable storage medium, and wherein the distinct software modules comprise a TCAD module, a statistical sampling module, and a TCAD-statistical interface module, said TCAD module in turn comprising a control module and a plurality of individual server modules;
wherein:
said mesh generating step is carried out by said TCAD module executing on at least one hardware processor;
said identifying steps are carried out by said statistical sampling module executing on said at least one hardware processor;
said netlist generating steps are carried out by said TCAD-statistical interface module executing on said at least one hardware processor;
said running steps are carried out by at least two of said individual server modules under control of said control module executing on said at least one hardware processor; and
said center of gravity computing step is carried out by said statistical sampling module executing on said at least one hardware processor.

8. The method of claim 2, further comprising providing a system, wherein the system comprises distinct software modules, each of the distinct software modules being embodied on a computer-readable storage medium, and wherein the distinct software modules comprise a TCAD module, a statistical sampling module, and a TCAD-statistical interface module;
wherein:
said mesh generating step is carried out by said TCAD module executing on at least one hardware processor;
said identifying step is carried out by said statistical sampling module executing on said at least one hardware processor;
said netlist generating step is carried out by said TCAD-statistical interface module executing on said at least one hardware processor; and
said running step is carried out by said TCAD module executing on said at least one hardware processor.

* * * * *